US012807212B2

(12) United States Patent
Ku et al.

(10) Patent No.: US 12,807,212 B2
(45) Date of Patent: Nov. 24, 2026

(54) STEERING DEVICE OF VEHICLE

(71) Applicant: HL Mando Corporation, Pyeongtaek-si (KR)

(72) Inventors: Sangchul Ku, Seoul (KR); Sunghun Park, Anyang-si (KR); Jeongrae Kim, Seoul (KR); Sungjune Moon, Seoul (KR); Taeho Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 587 days.

(21) Appl. No.: 18/241,240

(22) Filed: Sep. 1, 2023

(65) Prior Publication Data

US 2024/0326899 A1 Oct. 3, 2024

(30) Foreign Application Priority Data

Mar. 31, 2023 (KR) ........................ 10-2023-0043072

(51) Int. Cl.
*B62D 5/04* (2006.01)

(52) U.S. Cl.
CPC ......... *B62D 5/0421* (2013.01); *B62D 5/0445* (2013.01)

(58) Field of Classification Search
CPC ...... B62D 5/0421; B62D 5/0445; B62D 1/16; B62D 1/195
USPC .................................................. 180/443, 444
See application file for complete search history.

(56) References Cited

U.S. PATENT DOCUMENTS

| | | | | |
|---|---|---|---|---|
| 2011/0247891 A1* | 10/2011 | Meyer | B62D 5/0403 180/443 |
| 2019/0111960 A1 | 4/2019 | Freudenstein et al. | |
| 2021/0001916 A1* | 1/2021 | Appleyard | B62D 1/187 |

FOREIGN PATENT DOCUMENTS

| | | | | |
|---|---|---|---|---|
| CN | 202138407 U * | 2/2012 | |
| EP | 2572960 A1 * | 3/2013 | B62D 1/181 |
| EP | 2572961 A1 * | 3/2013 | B62D 1/181 |
| KR | 10-2004-0063800 A | 7/2004 | |
| KR | 10-2018-0134007 A | 12/2018 | |
| KR | 10-2020-0110205 A | 9/2020 | |
| WO | WO-2020185030 A1 * | 9/2020 | B62D 1/195 |

OTHER PUBLICATIONS

Office Action dated Mar. 3, 2026 for corresponding Korean Patent Application No. 10-2023-0043072, along with an English machine translation (14 pages).

* cited by examiner

*Primary Examiner* — Jacob D Knutson
(74) *Attorney, Agent, or Firm* — Hauptman Ham, LLP

(57) ABSTRACT

According to the present embodiments, it is possible to rapidly perform an operation of storing and withdrawing a steering wheel for securing a space in a driver's seat, and strengthen the rigidity of, and easily adjust, the operation of the steering column for storing and withdrawing the steering wheel.

17 Claims, 12 Drawing Sheets

STEERING DEVICE OF VEHICLE

CROSS-REFERENCE TO RELATED APPLICATION

This application claims priority from Korean Patent Application No. 10-2023-0043072, filed on Mar. 31, 2023, which is hereby incorporated by reference for all purposes as if fully set forth herein.

BACKGROUND

Field

The present embodiments relate to a steering device of a vehicle, and more particularly, to a steering device of a vehicle capable of rapidly performing an operation of storing and withdrawing a steering wheel for securing a space in a driver's seat, and strengthening the rigidity of, and easily adjusting, the operation of the steering column for storing and withdrawing the steering wheel.

Description of Related Art

A vehicle steering device is a device for changing the traveling direction of the vehicle as intended by the user and turns the left and right wheels of the vehicle to the left or right to allow the vehicle to travel in the direction desired by the driver.

The steering device includes a steering column for receiving the steering shaft connected with the steering wheel. Typically, the steering column has the telescoping and tilting functionality for adjusting the position of the steering wheel to fit the driver's height and body shape.

Recently, autonomous vehicles are advancing rapidly. Autonomous vehicles provide various features for enabling the driver to do various activities in autonomous driving mode. However, since the steering wheel takes up a lot of space in the driver's seat and interferes with the driver's movement, a steering column that may store the steering wheel in the vehicle body in autonomous driving mode and withdraw the steering wheel from the vehicle body in manual mode is being developed.

However, as the traveling distance of the steering wheel increases, the time required for storing and withdrawing the steering wheel increases and the rigidity decreases, so there is a need for a steering column that may quickly and stably store and withdraw the steering wheel.

BRIEF SUMMARY

As devised in the foregoing background, the present embodiments relate to a steering device of a vehicle capable of rapidly performing an operation of storing and withdrawing a steering wheel for securing a space in a driver's seat, and strengthening the rigidity of, and easily adjusting, the operation of the steering column for storing and withdrawing the steering wheel.

According to the present embodiments, there may be provided a steering device of a vehicle, comprising an upper tube receiving a steering shaft, a lower tube receiving the upper tube, a movable bracket to which the lower tube is coupled, a fixed bracket fixed to a vehicle body, having the movable bracket slidably coupled thereto, provided with a pressing member pressing the movable bracket, and configured such that a pressing force provided to the movable bracket by the pressing member is adjustable, a first driver for sliding the upper tube with respect to the lower tube, and a second driver for sliding the movable bracket with respect to the fixed bracket.

According to the present embodiments, there may be provided a steering device of a vehicle, comprising an upper tube receiving a steering shaft, a lower tube receiving the upper tube, a movable bracket to which the lower tube is coupled, a fixed bracket fixed to a vehicle body, opening to two axially opposite sides, and including a receiving part receiving the movable bracket and a pair of plate parts supported on two widthwise opposite side surfaces of the movable bracket, each of the plate parts provided with a pressing member supported on the movable bracket in a width direction, a first driver for sliding the upper tube with respect to the lower tube, and a second driver for sliding the movable bracket with respect to the fixed bracket.

According to the present embodiments, it is possible to rapidly perform an operation of storing and withdrawing a steering wheel for securing a space in a driver's seat, and strengthen the rigidity of, and easily adjust, the operation of the steering column for storing and withdrawing the steering wheel.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
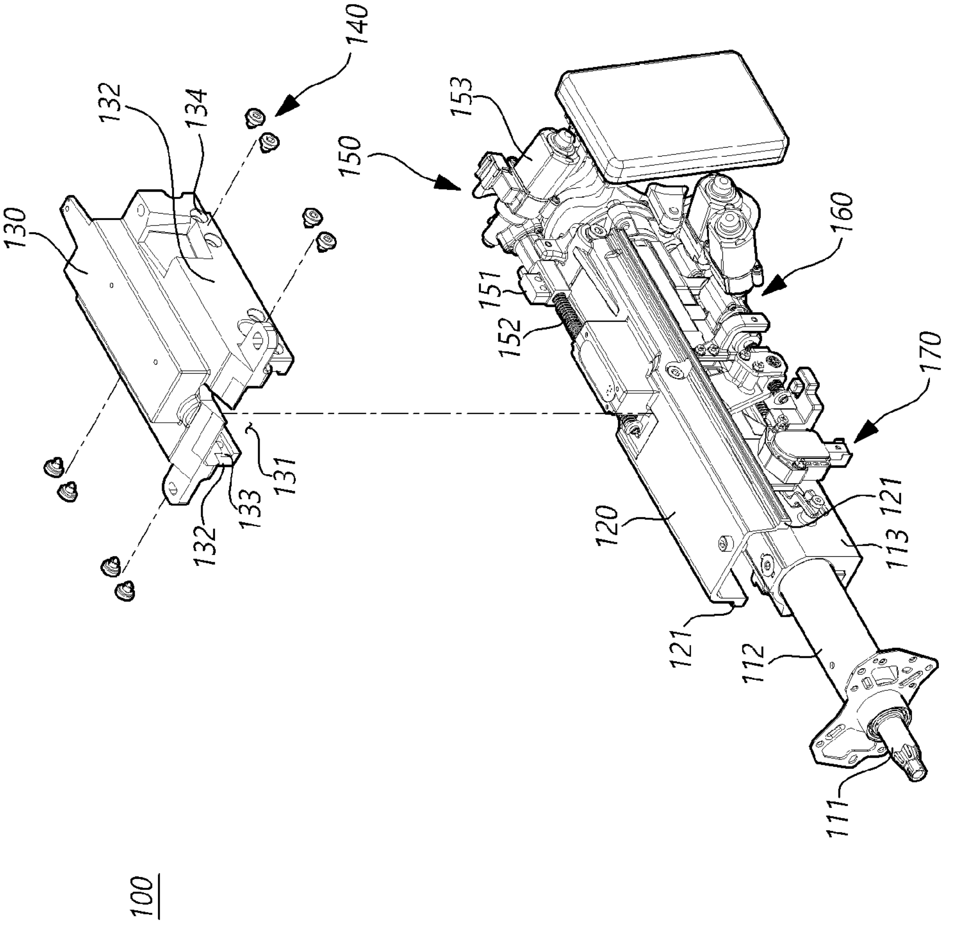
FIG. 1 is an exploded perspective view illustrating a steering column for a vehicle according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
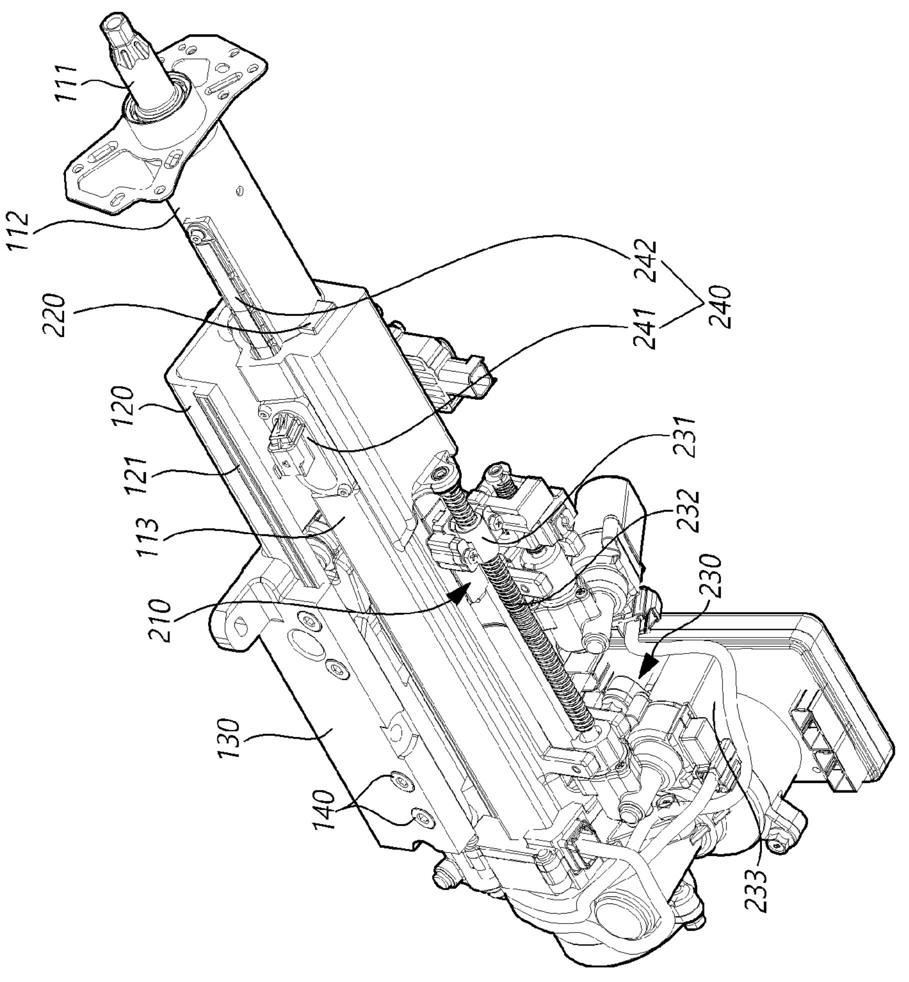
FIG. 2 is a perspective view illustrating a steering device of a vehicle according to the present embodiments.
Figure 3:
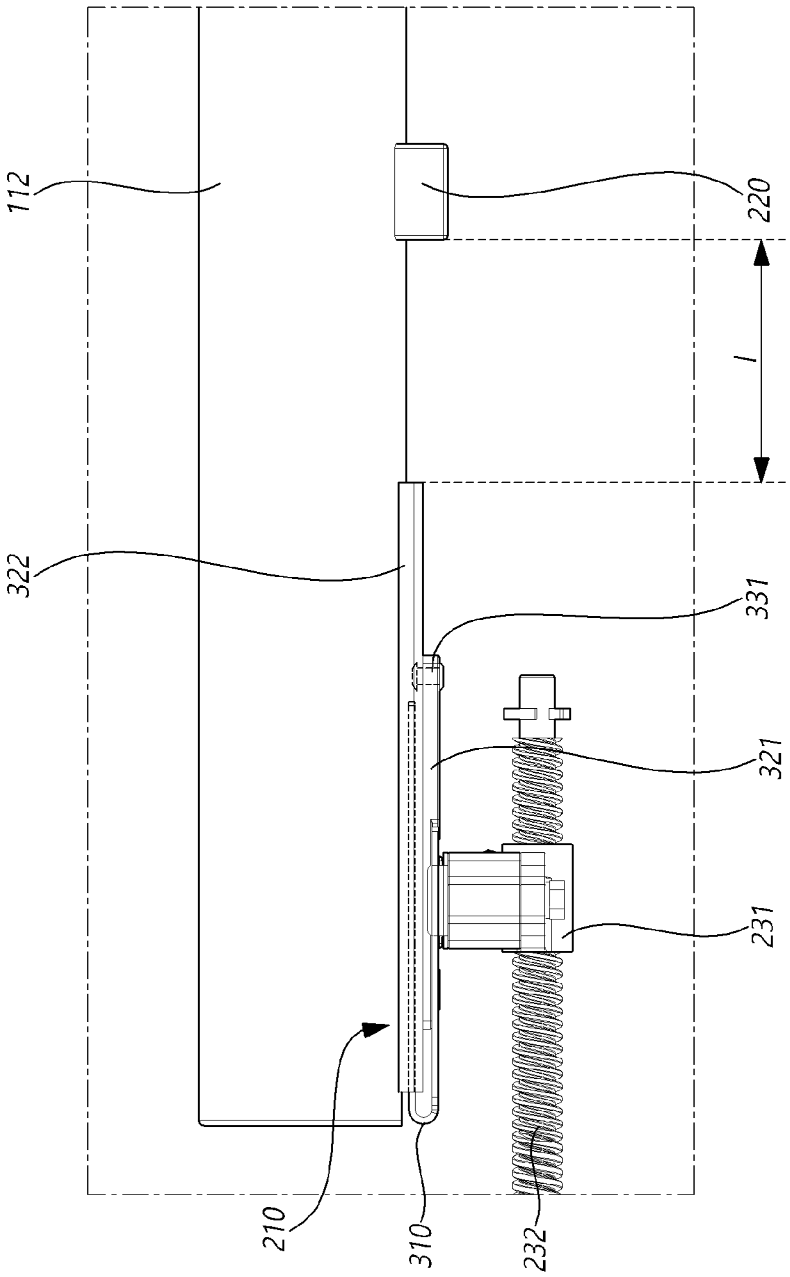
FIG. 3 is a side view illustrating a portion of a steering device of a vehicle according to the present embodiments.
Figure 4:
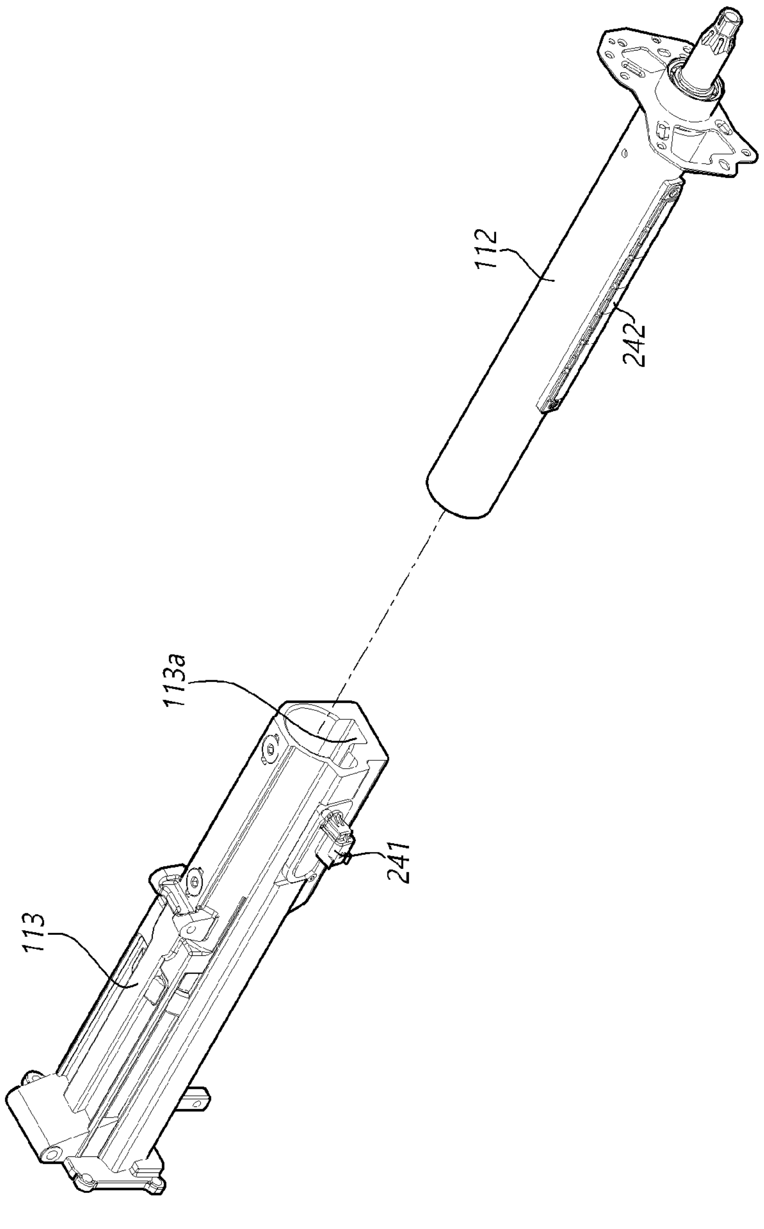
FIG. 4 is an exploded perspective view illustrating a portion of a steering device of a vehicle according to the present embodiments.
Figure 5A:
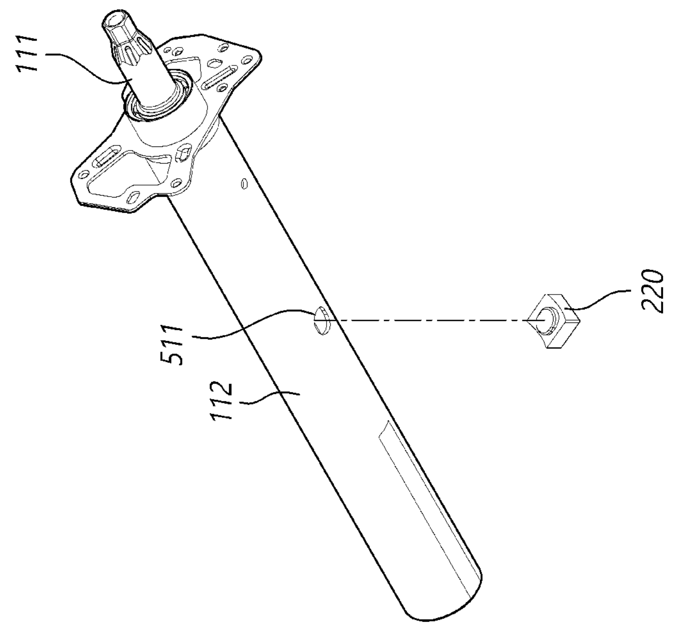
FIGS. 5A and 5B are an exploded perspective view illustrating a portion of a steering device of a vehicle according to the present embodiments.
Figure 5B:
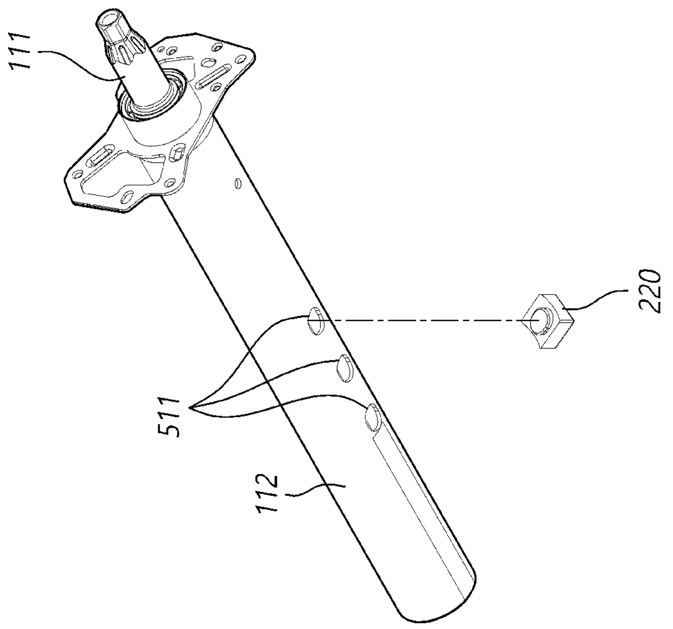
Figure 6:
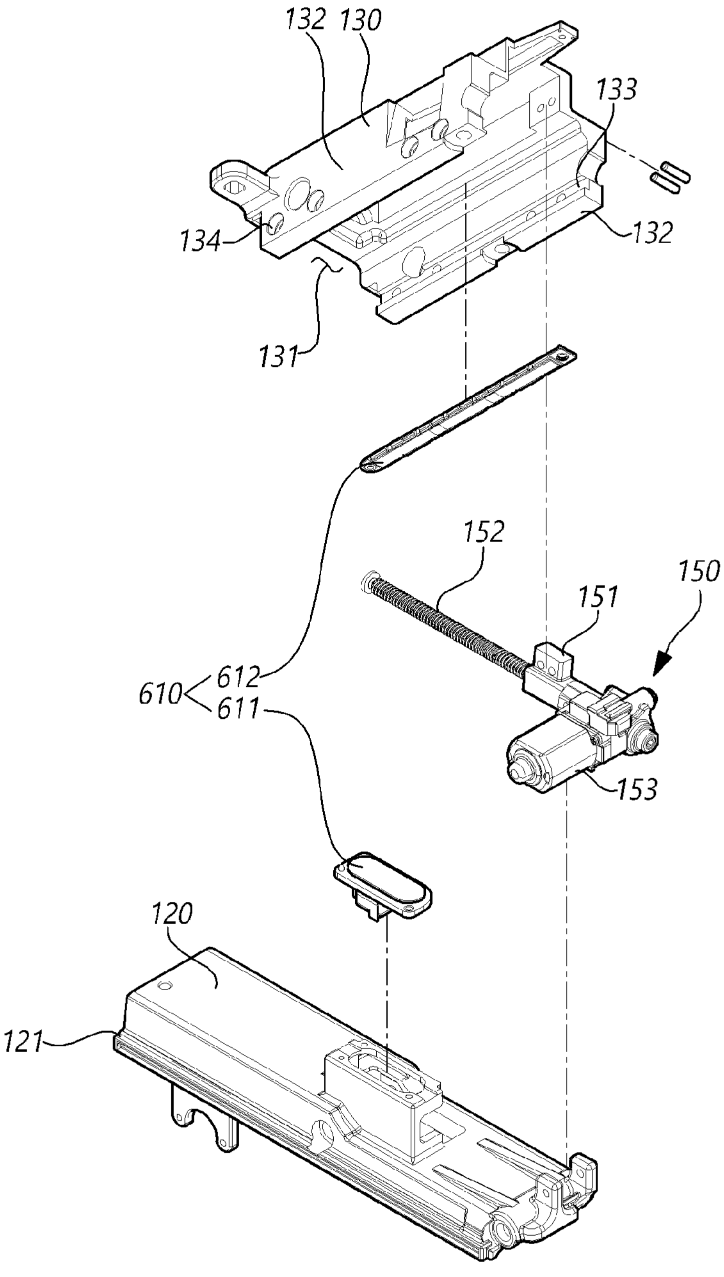
FIG. 6 is an exploded perspective view illustrating a portion of a steering device of a vehicle according to the present embodiments.
Figure 7:
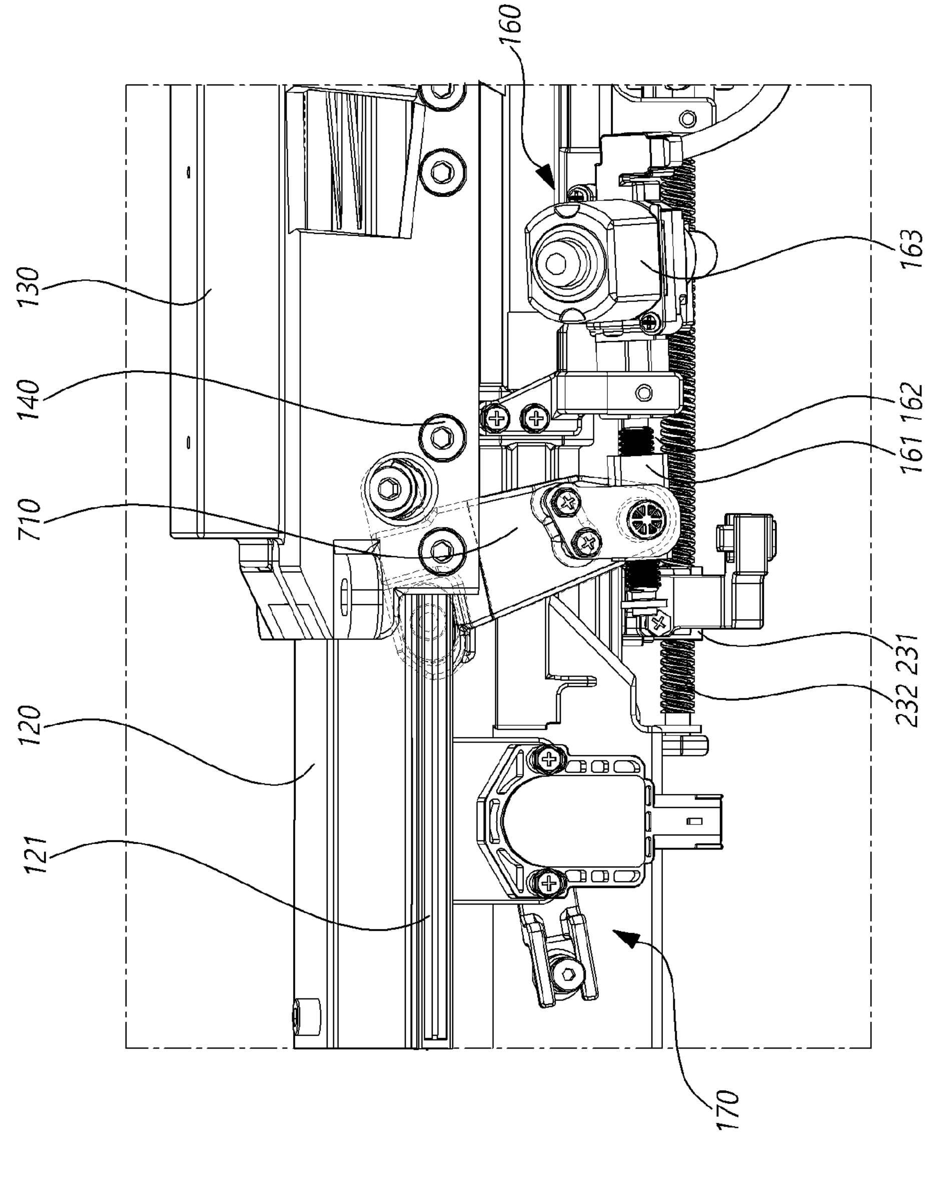
FIG. 7 is a side view illustrating a portion of a steering device of a vehicle according to the present embodiments.
Figure 8:
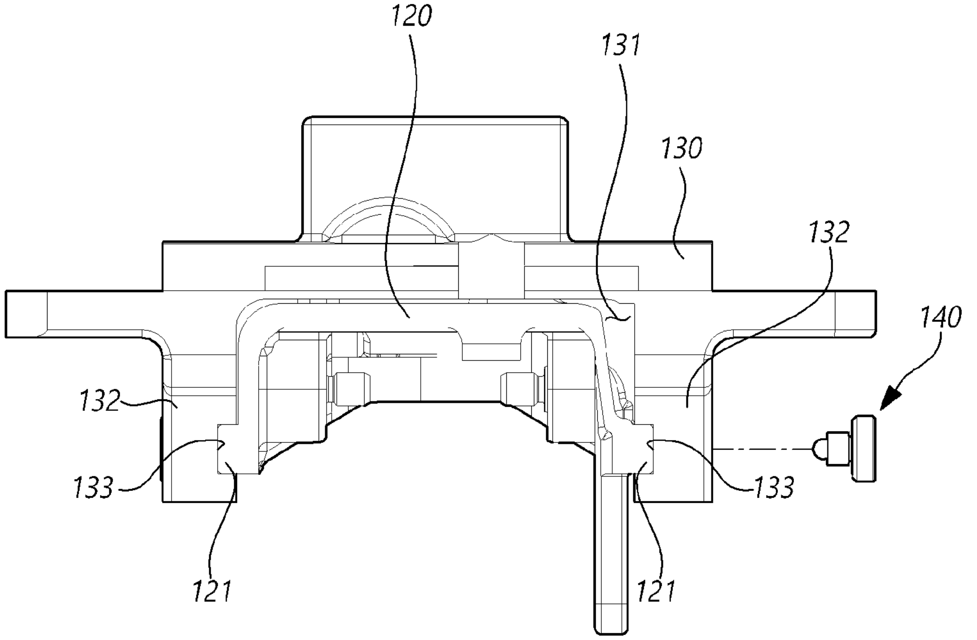
FIG. 8 is a front view illustrating a portion of a steering device of a vehicle according to the present embodiments.
Figure 9A:
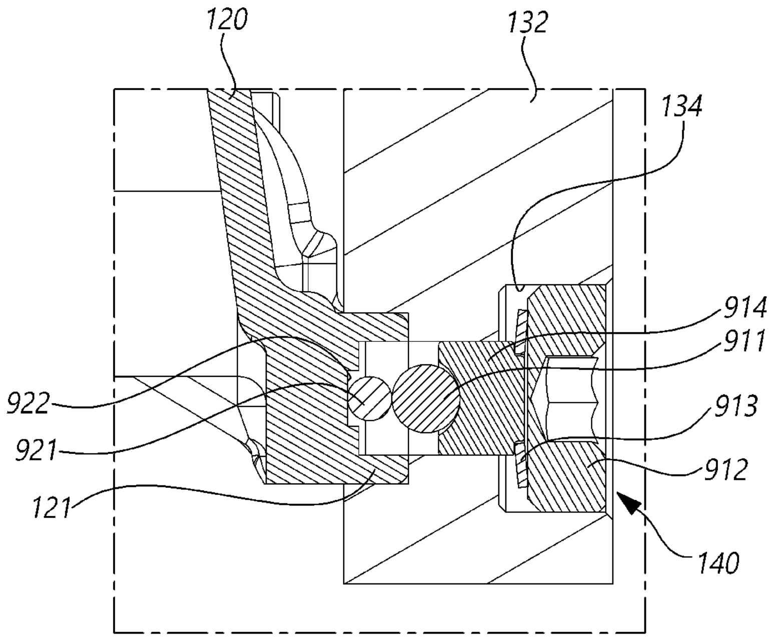
FIGS. 9A and 9B are a cross-sectional view illustrating a portion of a steering device of a vehicle according to the present embodiments.
Figure 9B:
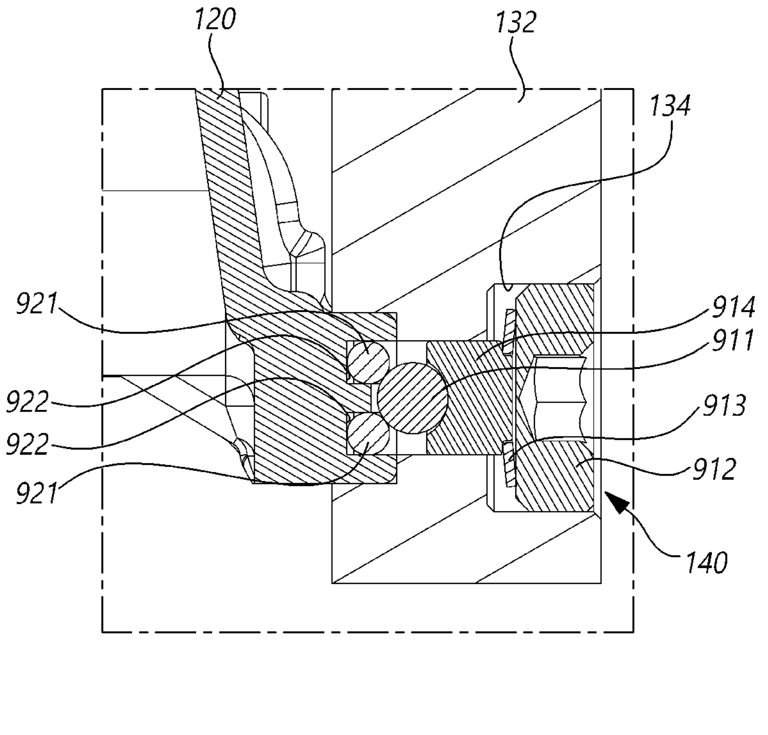
Figure 10:
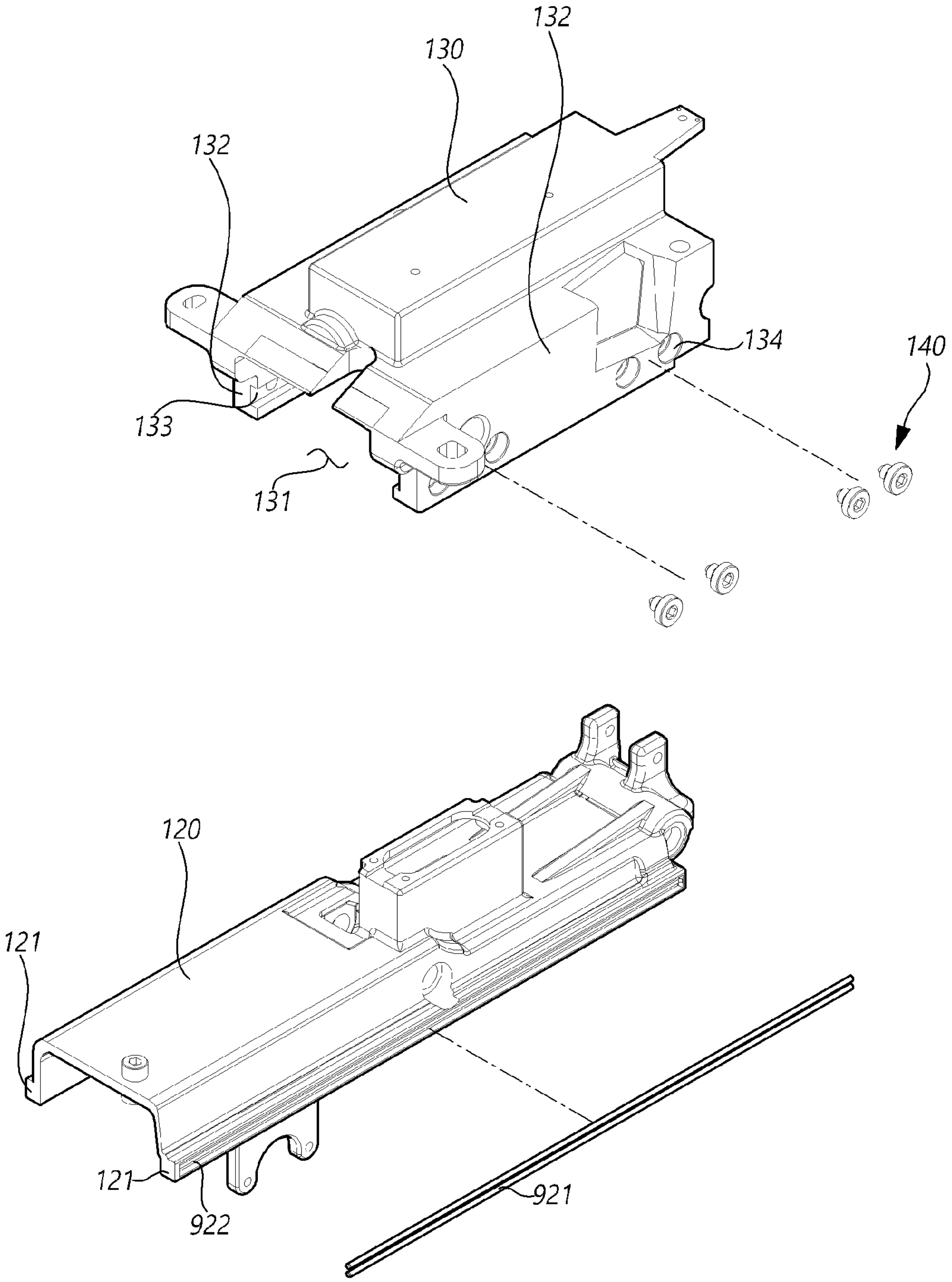
FIG. 10 is an exploded perspective view illustrating a portion of a steering device of a vehicle according to the present embodiments.

FIG. 1 is an exploded perspective view illustrating a steering column for a vehicle according to the present embodiments. FIG. 2 is a perspective view illustrating a steering device of a vehicle according to the present embodiments. FIG. 3 is a side view illustrating a portion of a steering device of a vehicle according to the present embodiments. FIG. 4 is an exploded perspective view illustrating a portion of a steering device of a vehicle according to the present embodiments. FIGS. 5A and 5B are an exploded perspective view illustrating a portion of a steering device of a vehicle according to the present embodiments. FIG. 6 is an exploded perspective view illustrating a portion of a steering device of a vehicle according to the present embodiments. FIG. 7 is a side view illustrating a portion of a steering device of a vehicle according to the present embodiments. FIG. 8 is a front view illustrating a portion of a steering device of a vehicle according to the present embodiments. FIGS. 9A and 9B are a cross-sectional view illustrating a portion of a steering device of a vehicle according to the present embodiments. FIG. 10 is an exploded perspective view illustrating a portion of a steering device of a vehicle according to the present embodiments.

A steering device 100 of a vehicle according to the present embodiments includes an upper tube 112 receiving a steering shaft 111, a lower tube 113 receiving the upper tube 112, a movable bracket 120 to which the lower tube is coupled, a fixed bracket 130 fixed to a vehicle body, having the movable bracket 120 slidably coupled thereto, provided with a pressing member 140 pressing the movable bracket 120, and configured such that a pressing force provided to the movable bracket 120 by the pressing member 140 is adjustable, a first driver 230 for sliding the upper tube 112 with respect to the lower tube 113, and a second driver 150 for sliding the movable bracket 120 with respect to the fixed bracket 130.

Referring to FIGS. 1 and 2, a steering device 100 of a vehicle according to the present embodiments includes an upper tube 112, a lower tube 113, a movable bracket 120, a fixed bracket 130, a first driver 230, and a second driver 150.

The upper tube 112 receives the steering shaft 111 and is inserted into the lower tube 113 to be axially slidable with respect to the lower tube 113. The first driver 230 is coupled to the upper tube 112 and the lower tube 113. As the first driver 120 slides the upper tube 112 with respect to the lower tube 113, a telescoping motion of the steering column is performed.

The upper tube 112 and the lower tube 113 may be provided with a sensor 240 for sensing the position of the upper tube 112 with respect to the lower tube 113. The sensor 240 may include a magnetic part 242 provided in the upper tube 112 and a sensor part 241 provided in the lower tube 113. The sensor 240, together with the upper tube 112, may sense the position of the upper tube 112 with respect to the lower tube 113 from a change in magnetic flux that occurs when the magnet part 242 moves.

According to an embodiment, the first driver 230 may include a nut 231 coupled to the upper tube 112, a screw 232 engaged with the nut 231, and a motor 233 coupled to the lower tube 113 to rotate the screw 232. A telescoping motion is performed by driving the first driver 230, and during the telescoping motion, the motor 233 is fixed in the axial direction with respect to the lower tube 113 and the nut 231 is fixed in the axial direction with respect to the upper tube 112. The screw 232 is rotated by the motor 233, and the nut 231 is moved on the screw 232, and accordingly, the upper tube 112 is moved axially with respect to the lower tube 113.

According to an embodiment, the first driver 230 may further include a reducer connecting the screw 232 and the motor 233. The motor 233 may be coupled to the lower tube 113 through a housing receiving the reducer. The reducer connecting the screw 232 and the motor 233 may be, e.g., a reducer including a worm shaft-worm wheel.

Referring to FIG. 3, according to an embodiment, the nut 231 may be coupled to the upper tube 112 through an impact load absorber 210 including a bending plate 310. The impact load absorber 210 fixes the nut 231 and the upper tube 112 in the axial direction in the telescoping motion. However, when an external impact occurs, the nut 231 and the upper tube 112 are no longer fixed in the axial direction, and the collapsing motion starts. In the process of performing the collapsing motion, the bending plate 310 is plastically deformed, and the impact load absorber 210 absorbs the impact load to protect the driver.

The impact load absorber 210 may include a bending plate 310, a first bracket 321 coupled to one end of the bending plate 310 and the nut 231, and a second bracket 322 fixed to the upper tube 112 and coupled to the first bracket 321 through a front end member 331. In the telescoping motion, the first bracket 321 and the second bracket 322 are fixed in the axial direction by the front end member 331. However, if the front end member 331 is broken by an external impact, the collapsing motion is started, and the upper tube 112 and the nut 231 are moved with respect to each other. In the process of performing the collapsing motion, the bending plate 310 is plastically deformed, absorbing the impact load.

According to an embodiment, a stopper 220 overlapping the impact load absorber 210 in the axial direction may be provided on the outer circumferential surface of the upper tube 112. The stopper 220 overlaps the impact load absorber 210 in the axial direction on the outer circumferential surface of the upper tube 112 and is provided to be spaced apart by a predetermined distance. In the telescoping motion, since the impact load absorber 210 moves together with the upper tube 112, the distance between the stopper 220 and the impact load absorber 210 is maintained. However, in the collapsing motion, as the collapsing motion proceeds, the distance between the stopper 220 and the impact load absorber 210 is reduced, the stopper 220 is supported axially by the impact load absorber 210, and the collapsing stroke is limited. More specifically, the stopper 220 may be supported in the axial direction on the first bracket 321, and the collapsing stroke may be limited.

Since the stopper 220 is supported in the impact load absorber 210 in the axial direction and the maximum collapsing stroke (see reference numeral 1) is limited, it is possible to structurally prevent the stopper 220 from collapsing deeper than the plastic deformation stroke of the bending plate 310. Therefore, since load absorption due to plastic deformation of the bending plate 310 is continuously provided from the start to the end of the collapsing motion, the collapsing motion may be stably performed.

Referring to FIG. 4, according to an embodiment, guide grooves 113*a* may be formed in the lower tube 113 to be opened to two opposite sides in the axial direction to receive the stopper 220. The stopper 220 is provided on the outer circumferential surface of the upper tube 112 and is moved axially from the guide groove 113*a* of the lower tube 113 during the telescoping motion and the collapsing motion. As the stopper 220 is inserted into the guide groove 113*a*, when the stopper 220 is axially supported by the impact load absorber 210 and the collapsing stroke is limited, the stopper 220 is prevented from being separated from the upper tube 112. Accordingly, the collapsing motion may be stably terminated.

Referring to FIG. 5A, according to an embodiment, a coupling part 511 to which the stopper 220 may be coupled may be formed in the upper tube 112. The coupling part 511 may be a hole penetrating the inner circumferential surface and the outer circumferential surface of the upper tube 112, and a protrusion inserted into the coupling part 511 may be formed in the stopper 220. The protrusion of the stopper 220 may be press-fitted into the coupling part 511.

Referring to FIG. 5B, according to an embodiment, the upper tube 112 may be provided with a plurality of coupling parts 511 to which the stopper 220 may be coupled, spaced apart in the axial direction. The drawings illustrate an embodiment in which three coupling parts 511 are provided while being spaced apart in the axial direction. In other words, the position of the stopper 220 may be adjusted on the outer circumferential surface of the upper tube 112. Since the distance between the stopper 220 and the impact load absorber 210 is changed according to the assembly position of the stopper 220, the maximum collapsing stroke may be easily adjusted in the assembly step. Therefore, it is possible to provide various collapsing strokes according to characteristics of each vehicle type.

Referring back to FIG. 1, the movable bracket 120 is coupled to the fixed bracket 130, and the fixed bracket 130 is fixed to the vehicle body. In other words, the steering column is coupled to the vehicle body through the fixed bracket 130. The movable bracket 120 is coupled to the fixed bracket 130 so as to be slidable in the axial direction. As the movable bracket 120 slides in the axial direction with respect to the fixed bracket 130, the entire steering column is moved in the axial direction. The second driver 150 moves the movable bracket 120 with respect to the fixed bracket 130, and accordingly, the steering column is moved in the axial direction.

The fixed bracket 130 is provided with a pressing member 140, and the pressing member 140 presses the movable bracket 120. The restraining force of the movable bracket 120 to the fixed bracket 130 is increased by the pressing force provided by the pressing member 140, and thus the rigidity of the sliding operation is strengthened. Further, the pressing force provided by the pressing member 140 to the movable bracket 120 may be adjusted. In other words, the pressing force of the pressing member 140 may be adjusted according to the characteristics of each vehicle, or the weakened rigidity may be reinforced by increasing the pressing force.

The fixed bracket 130 may include a receiving part 131 in which the movable bracket 120 is received and a pair of plate parts 132 supported on two opposite side surfaces of the movable bracket 120 in the width direction. The pressing members 140 may be provided on the plate parts 132 to provide pressing force to two widthwise opposite sides of the movable bracket 120. The pressing member 140 is described below in detail.

Referring to FIG. 6, according to an embodiment, the second driver 150 may include a nut 151 coupled to the fixed bracket 130, a screw 152 engaged with the nut 151, and a motor 153 coupled to the movable bracket 120 to rotate the screw 152. The nut 151 may be coupled to the fixed bracket 130 by a pin penetrating the fixed bracket 130.

The fixed bracket 130 and the movable bracket 120 may be provided with a sensor 610 for sensing the position of the movable bracket 120 with respect to the fixed bracket 130. The sensor 610 may include a magnetic part 612 coupled to the fixed bracket 130 and a sensor part 611 coupled to the movable bracket 120. The sensor 610 may sense the position of the movable bracket 120 with respect to the fixed bracket 130 from a change in magnetic flux that occurs when the movable bracket 120 moves with respect to the fixed bracket 130.

According to an embodiment, the second driver 150 may further include a reducer connecting the screw 152 and the motor 153. The motor 153 may be coupled to the lower tube 113 through a housing receiving the reducer. The reducer connecting the screw 152 and the motor 153 may be, e.g., a reducer including a worm shaft-worm wheel.

The operation of storing and withdrawing the steering wheel may be performed by simultaneously moving the movable bracket 120 with respect to the fixed bracket 130 by the second driver 150 and moving the upper tube 112 with respect to the lower tube 113 by the first driver 230. In other words, since the steering wheel moves according to the movement generated by the first driver 230 and the second driver 150, the storing and withdrawing operation may be quickly performed.

Referring to FIG. 7, the steering device 100 of the vehicle according to the present embodiments may further include a tilt bracket 710 rotatably coupled to each of the fixed bracket 130 and the movable bracket 120 and a third driver 160 for rotating the tilt bracket 710. The tilt bracket 710 rotates around a portion coupled to the fixed bracket 130. As the third driver 160 rotates the tilt bracket 710, the portion coupled to the movable bracket 120 of the tilt bracket 710 ascends or descends, and the steering column is tilted. The movable bracket 120 and the lower tube 113 may be provided with the sensor 170 for sensing the tilting angle of the lower tube 113.

According to an embodiment, the third driver 160 may include a nut 161 coupled to the tilt bracket 710, a screw 162 engaged with the nut 161, and a motor 163 coupled to the lower tube 113 to rotate the screw 162. As the screw 162 is rotated by the motor 163, and the nut 161 is moved on the screw 162, the tilt bracket 710 is rotated. The third driver 160 may further include a reducer connecting the screw 162 and the motor 163. The motor 163 may be coupled to the lower tube 113 or the fixed bracket 130. When the motor 163 is coupled to the lower tube 113, the motor 163 together with the lower tube 113 may move in the axial direction to cause interference with peripheral components, whereas when the motor 163 is coupled to the fixed bracket 130, it does not move in the axial direction, and thus interference with peripheral components may be minimized. The motor 163 may be coupled to the lower tube 113 or the fixed bracket 130 through the housing receiving the reducer.

A steering device 100 of a vehicle according to the present embodiments includes an upper tube 112 receiving a steering shaft 111, a lower tube 113 receiving the upper tube 112, a movable bracket 120 to which the lower tube 113 is coupled, a fixed bracket 130 fixed to a vehicle body, opening to two axially opposite sides, and including a receiving part 131 receiving the movable bracket 120 and a pair of plate parts 132 supported on two widthwise opposite side surfaces of the movable bracket 120, each of the plate parts 132 provided with a pressing member 140 supported on the movable bracket 120 in a width direction, a first driver 230 for sliding the upper tube 112 with respect to the lower tube 113, and a second driver 150 for sliding the movable bracket 120 with respect to the fixed bracket 130. The same features as those of the above-described embodiments will be briefly described, and the description focuses primarily on differences.

Referring to FIGS. 1 and 8, the fixed bracket 130 includes a receiving part 131 and a plate part 132. The movable bracket 120 is received in the receiving part 131, and the receiving part 131 is opened to two opposite sides in the axial direction so that the movable bracket 120 may move in the axial direction. A pair of plate parts 132 are provided to be supported on two opposite side surfaces of the movable bracket 120 in the width direction, and the movable bracket 120 is coupled to be slidable in the axial direction. As the plate parts 132 are supported on two opposite side surfaces of the movable bracket 120 in the width direction and guide the axial movement of the movable bracket 120, the operation of storing and withdrawing the steering wheel may be stably performed.

The plate part 132 is provided with a pressing member 140 that is supported by the movable bracket 120 in the width direction and provides a pressing force. The rigidity of the axial moving structure of the movable bracket 120 with respect to the fixed bracket 130 is enhanced by the pressing force provided by the pressing member 140 to the movable bracket 120. Further, as is described below in detail, the pressing force provided by the pressing member 140 to the movable bracket 120 may be adjusted. Therefore, it is possible to adjust the rigidity or reinforce the weakened rigidity according to the characteristics of each vehicle type.

According to an embodiment, rail recesses 133 may be formed in the inner surfaces of the plate parts 132 along the axial direction, and guide protrusions 121 inserted into the rail recesses 133 may be formed on two opposite side surfaces of the movable bracket 120 in the width direction. Like the receiving part 131, the rail recess 133 may be opened in the axial direction. The guide protrusion 121 is inserted into the rail recess 133, and the movable bracket 120 is coupled to the fixed bracket 130.

The rail recess 133 may be formed from one end to the other end of the plate 132 in the axial direction, and the guide protrusion 121 may be formed from one end to the other end of the movable bracket 120 in the axial direction. In other words, the movable bracket 120 has a wide contact area with the fixed bracket 130 and slides. Accordingly, the stability of the storing and withdrawing operation of the steering wheel is enhanced.

According to an embodiment, the guide protrusion 121 may include a protrusion protruding from two opposite side surfaces of the movable bracket 120 in the width direction and a bend at an end portion of the protrusion. The rail groove 133 is formed in a shape corresponding to the shapes of the protrusion and the bend. The protrusion may protrude in a direction perpendicular to two widthwise opposite side surfaces of the movable bracket 120, and the bend may be bent and extended in a direction inclined upward or downward with respect to the protrusion at an end portion of the protrusion. As the guide protrusion 121 includes a protrusion and a bend, the guide protrusion 121 is supported on the fixed bracket 130 in two opposite width directions while being inserted into the rail groove 133. Accordingly, the stability of the axial movement of the movable bracket 120 may be further enhanced. Further, according to an embodiment, a bushing for reducing friction may be further provided between the guide protrusion 121 and the rail groove 133.

According to an embodiment, a coupling hole 134 penetrating the plate part 132 in the width direction may be formed in the plate part 132, and the pressing member 140 may be inserted into the coupling hole 134, and an end portion thereof may be supported by the movable bracket 120. The coupling hole 134 may be formed such that the pressing member 140 is supported by the guide protrusion 121 of the movable bracket 120. In other words, according to an embodiment, the rail grooves 133 may be formed in the inner surface of the plate part 132 along the axial direction, the guide protrusions 121 inserted into the rail grooves 133 may be formed on two widthwise opposite side surfaces of the movable bracket 120, and the coupling holes 134 may be formed to pass through the portions where the rail grooves 133 are formed, so that an end portion of the pressing member 140 may be supported by the guide protrusion 121. As the pressing member 140 may provide a pressing force to the guide protrusion 121 supporting the slide of the movable bracket 120 and the fixed bracket 130, rigidity may be strengthened.

According to an embodiment, a plurality of coupling holes 134 may be formed to be spaced apart from each other in the axial direction, and the pressing member 140 may be inserted into each of the plurality of coupling holes 134. The drawings illustrate an embodiment in which, a total of eight coupling holes 134 are formed, four in one side surface of the movable bracket 120 in the width direction and four in the other side surface of the movable bracket 120 in the width direction. The coupling holes 134 are arranged to be spaced apart in the axial direction, and the pressing member 140 is inserted into each coupling hole 134 to provide a pressing force to the movable bracket 120. It is preferable that the coupling hole 134 is formed at least at one end and the other end of the plate part 132 in the axial direction.

Referring to FIGS. 9A and 9B, the pressing member 140 may include a support member 911 supported on the movable bracket 120, a coupling member 912 coupled to the fixed bracket 130, and an elastic member 913 elastically supporting the support member 911 with respect to the coupling member 912. The support member 911 may be, e.g., a ball, and the pressing member 140 may further include a seating member 914 where the support member 911 is seated. The elastic member 913 may be provided between the mounting member 914 and the coupling member 912 and supported by the coupling member 912, elastically supporting the support member 911 in the width direction toward the movable bracket 120.

According to an embodiment, the coupling member 912 may be screwed to the fixed bracket 130. Accordingly, as the elastic force provided by the elastic member 913 to the support member 911 is increased or decreased by moving forth and back the coupling member 912, the pressing force provided to the movable bracket 120 by the pressing member 140 may be adjusted.

Referring to FIGS. 9 and 10, according to an embodiment, a seating groove 922 may be formed in the movable bracket 120 along the axial direction, and a guide pin 921 supported by the support member 911 may be seated in the seating groove 922. The seating groove 922 may be formed in the guide protrusion 121 of the movable bracket 120. The seating groove 922 may be formed along the axial direction from one end to the other end of the movable bracket 120. The guide pin 921 is formed to be inserted from one end to the other end in the axial direction of the seating groove 922, and the support member 911 of the pressing member 140 is supported on the guide pin 921 when the movable bracket 120 slides with respect to the fixed bracket 130. As the pressing force provided by the pressing member 140 is provided to the movable bracket 120 through the guide pin 921, the pressing force of the pressing member 140 is dispersed along the axial direction and provided to the movable bracket 120, thereby enhancing stability.

According to an embodiment, a pair of seating grooves 922 vertically spaced apart from each other may be provided, and a guide pin 921 may be seated in each of the seating grooves 922. FIG. 9A illustrates an embodiment in which one seating groove 922 and one guide pin 921 are provided, and FIG. 9B illustrates an embodiment in which two seating grooves 922 and two guide pins 921 are provided. The guide pin 921 may be seated in each of the pair of seating grooves 922 spaced vertically apart from each other, and the support member 911 may be simultaneously supported by both the guide pins 921.

By the so-shaped vehicle steering device, it is possible to rapidly perform an operation of storing and withdrawing a steering wheel for securing a space in a driver's seat, and strengthen the rigidity of, and easily adjust, the operation of the steering column for storing and withdrawing the steering wheel.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering device of a vehicle, comprising:
an upper tube receiving a steering shaft;
a lower tube receiving the upper tube;
a movable bracket to which the lower tube is coupled;
a fixed bracket fixed to a vehicle body, having the movable bracket slidably coupled thereto, provided with a pressing member pressing the movable bracket, and configured such that a pressing force provided to the movable bracket by the pressing member is adjustable;
a first driver for sliding the upper tube with respect to the lower tube; and
a second driver for sliding the movable bracket with respect to the fixed bracket,
wherein the first driver includes a nut coupled to the upper tube, a screw engaged with the nut, and a motor coupled to the lower tube to rotate the screw, and
wherein the nut is coupled to the upper tube through an impact load absorber including a bending plate.

2. The steering device of claim 1, wherein the first driver further includes a reducer connecting the screw and the motor.

3. The steering device of claim 1, wherein a stopper axially overlapping the impact load absorber is provided on an outer circumferential surface of the upper tube.

4. The steering device of claim 3, wherein the lower tube has a guide recess opened to two axially opposite sides to receive the stopper.

5. The steering device of claim 4, wherein the upper tube includes a plurality of coupling parts to which the stopper may be coupled and which are axially spaced apart from each other.

6. The steering device of claim 1, wherein the second driver includes a nut coupled to the fixed bracket, a screw engaged with the nut, and a motor coupled to the movable bracket to rotate the screw.

7. The steering device of claim 6, wherein the second driver further includes a reducer connecting the screw and the motor.

8. The steering device of claim 1, further comprising:
a tilt bracket rotatably coupled to each of the fixed bracket and the movable bracket; and
a third driver for rotating the tilt bracket.

9. The steering device of claim 8, wherein the third driver includes a nut coupled to the tilt bracket, a screw engaged with the nut, and a motor coupled to the lower tube to rotate the screw.

10. A steering device of a vehicle, comprising:
an upper tube receiving a steering shaft;
a lower tube receiving the upper tube;
a movable bracket to which the lower tube is coupled;
a fixed bracket fixed to a vehicle body, opening to two axially opposite sides, and including a receiving part receiving the movable bracket and a pair of plate parts supported on two widthwise opposite side surfaces of the movable bracket, each of the plate parts provided with at least one pressing member supported on the movable bracket in a width direction;

a first driver for sliding the upper tube with respect to the lower tube; and a second driver for sliding the movable bracket with respect to the fixed bracket, wherein a respective rail recess is formed in an inner surface of each of the plate parts along an axial direction, and wherein at least one guide protrusion inserted into a corresponding one of the rail recess is formed on the two widthwise opposite side surfaces of the movable bracket.

11. A steering device of a vehicle, comprising:

an upper tube receiving a steering shaft;

a lower tube receiving the upper tube;

a movable bracket to which the lower tube is coupled;

a fixed bracket fixed to a vehicle body, opening to two axially opposite sides, and including a receiving part receiving the movable bracket and a pair of plate parts supported on two widthwise opposite side surfaces of the movable bracket, each of the plate parts provided with at least one pressing member supported on the movable bracket in a width direction;

a first driver for sliding the upper tube with respect to the lower tube; and a second driver for sliding the movable bracket with respect to the fixed bracket, wherein at least one coupling hole penetrating each of the plate parts in the width direction is formed in each of the plate parts, and wherein each of the at least one pressing member is inserted into a respective one of the at least one coupling hole and has an end portion supported by the movable bracket.

12. The steering device of claim 11, wherein a respective rail groove is formed in an inner surface of each of the plate parts along an axial direction, and at least one guide protrusion inserted into a corresponding one of rail grooves is provided on each of the opposite widthwise side surfaces of the movable bracket, and wherein each of the at least one coupling hole is formed to pass through a portion in which the corresponding rail groove is formed, and an end portion of the at least one pressing member is supported by a corresponding one of the at least one guide protrusion.

13. The steering device of claim 11, wherein the at least one coupling hole comprises a plurality of coupling holes spaced apart from each other in an axial direction, and wherein a respective pressing member is inserted into each of the plurality of coupling holes.

14. The steering device of claim 11, wherein each pressing member includes a support member supported by the movable bracket, a coupling member coupled to the fixed bracket, and an elastic member elastically supporting the support member with respect to the coupling member.

15. The steering device of claim 14, wherein the coupling member is screwed to the fixed bracket.

16. The steering device of claim 15, wherein at least one seating groove is formed in the movable bracket along an axial direction, and wherein a guide pin supported by the support member is seated in the at least one seating groove.

17. The steering device of claim 16, wherein the at least one seating groove comprises a pair of seating grooves vertically spaced apart from each other are provided, and wherein the guide pin is seated in each of the pair of seating grooves.

* * * * *